US011073808B2

(12) United States Patent
Frampton et al.

(10) Patent No.: US 11,073,808 B2
(45) Date of Patent: Jul. 27, 2021

(54) GENERATOR SYSTEM ARCHITECTURE

(71) Applicant: Kohler Co., Kohler, WI (US)

(72) Inventors: Isaac S. Frampton, Strattanville, PA (US); Steve Jungers, Random Lake, WI (US); Douglas W. Dorn, Sheyboygan Falls, WI (US); Allen Frederick, Chilton, WI (US)

(73) Assignee: Kohler Co., Kohler, WI (US)

(*) Notice: Subject to any disclaimer, the term of this patent is extended or adjusted under 35 U.S.C. 154(b) by 0 days.

(21) Appl. No.: 16/827,128

(22) Filed: Mar. 23, 2020

(65) Prior Publication Data
US 2020/0218216 A1 Jul. 9, 2020

Related U.S. Application Data

(63) Continuation of application No. 15/383,980, filed on Dec. 19, 2016, now Pat. No. 10,635,066.

(51) Int. Cl.
G05B 19/042 (2006.01)
F04B 39/00 (2006.01)
(Continued)

(52) U.S. Cl.
CPC .......... *G05B 19/042* (2013.01); *F04B 35/045* (2013.01); *F04B 39/0044* (2013.01);
(Continued)

(58) Field of Classification Search
CPC ........ G05B 19/042; G05B 2219/23219; F04B 39/121; F04B 35/045; F04B 39/0044; H02J 9/06; F16F 7/10
See application file for complete search history.

(56) References Cited

U.S. PATENT DOCUMENTS 5,973,481 A   10/1999   Thompson et al.
2002/0162032 A1   10/2002   Gundersen et al.
(Continued)

FOREIGN PATENT DOCUMENTS

CN   102064711 A   5/2011
CN   102185334 A   9/2011
(Continued)

OTHER PUBLICATIONS

European Office Action for European Patent Application No. 17 190 400.6-1202 dated Apr. 22, 2020.
(Continued)

*Primary Examiner* — Ziaul Karim
(74) *Attorney, Agent, or Firm* — Lempia Summerfield Katz, LLC

(57) ABSTRACT

A generator system for operation of at least one generator and at least one breaker includes an interface, a database, and a generator controller. The interface is configured to receive an architecture for the generator system. The database includes at least one generator parameter and at least one breaker parameter. The generator controller is configured to determine generator layouts from the architecture for the generator system. The generator controller determines a generator system command based on a comparison of the generator layouts, the at least one generator parameter, and the at least one breaker parameter.

17 Claims, 9 Drawing Sheets

(51) Int. Cl.
  *H02J 9/06* (2006.01)
  *F04B 35/04* (2006.01)
  *F04B 39/12* (2006.01)

(52) U.S. Cl.
  CPC .............. *F04B 39/121* (2013.01); *H02J 9/06* (2013.01); *G05B 2219/23219* (2013.01)

(56) References Cited

U.S. PATENT DOCUMENTS

| | | |
|---|---|---|
| 2005/0285574 A1 | 12/2005 | Huff et al. |
| 2008/0046387 A1 | 2/2008 | Gopal et al. |
| 2010/0274407 A1* | 10/2010 | Creed ................. H02J 3/14 700/295 |
| 2014/0039707 A1 | 2/2014 | Curtis et al. |
| 2015/0073615 A1 | 3/2015 | Forbes, Jr. |
| 2015/0241894 A1 | 8/2015 | Bartlett et al. |
| 2015/0318698 A1* | 11/2015 | Tani ................. H02J 3/46 700/287 |
| 2015/0380941 A1 | 12/2015 | Jain et al. |
| 2016/0013646 A1* | 1/2016 | Akerson ........... H02J 13/0006 307/39 |
| 2016/0105029 A1 | 4/2016 | Sun et al. |
| 2017/0288685 A1* | 10/2017 | Miyahara ............ H03L 7/095 |
| 2017/0322528 A1 | 11/2017 | Frampton et al. |

FOREIGN PATENT DOCUMENTS

| | | |
|---|---|---|
| CN | 102570446 A | 7/2012 |
| CN | 103116865 A | 5/2013 |
| CN | 103597689 A | 2/2014 |
| CN | 104485690 A | 4/2015 |
| CN | 104769809 A | 7/2015 |
| EP | 2937967 A1 | 10/2015 |
| EP | 3012939 A1 | 4/2016 |
| JP | 2001346333 A | 12/2001 |
| KR | 20150061096 A | 6/2015 |
| WO | WO03/073182 A1 | 9/2003 |
| WO | WO2014197931 A1 | 12/2014 |
| WO | WO2016094141 A1 | 6/2016 |

OTHER PUBLICATIONS

European Office Action for European Patent Application No. 17 190 400.6-1202 dated Sep. 4, 2019.

European Office Action for European Patent Application No. 17190400.6-1202, dated Mar. 6, 2017.

Chinese Office Action for Chinese Application No. 201111140537.8 dated Aug. 3, 2020.

European Office Action for European Patent Application No. 17 190 400.6-1202 dated Sep. 15, 2020.

* cited by examiner

GENERATOR SYSTEM ARCHITECTURE

CROSS-REFERENCE TO OTHER APPLICATIONS

This application is a continuation under 35 U.S.C. § 120 and 37 C.F.R. § 1.53(b) of U.S. patent application Ser. No. 15/383,980 filed Dec. 19, 2016, which is hereby incorporated by reference in its entirety.

TECHNICAL FIELD

This application relates to the field of generators, and more specifically, a generator system architecture that is configured and/or reconfigured based on feedback from the generator system and/or characteristics of elements of the generator system.

BACKGROUND

An engine-generator set, which may be referred to as a generator or a genset, may include an engine and an alternator or another device for generating electrical energy or power. One or more generators may provide electrical power to a load through a power bus. A generator may be connected to the power bus through a switch (e.g., circuit breaker). The power bus, which may be referred to as a generator bus or common bus, transfers the electrical power from the engine-generator set to a load.

In many situations, a generator system may include a static architecture layout for the one or more generators. That is, the one or more generators are connected in a particular way in the static architecture layout. However, the static architecture layout, or the particular way the one or more generators are connected is not always the best option. Inputs to the generator system may change, the operational requirements on the generator system may change or user preferences and expectations may change. Depending on these variables, different architecture layouts for the generator system may be preferred at different times.

BRIEF DESCRIPTION OF THE DRAWINGS

Exemplary embodiments are described herein with reference to the following drawings.

DETAILED DESCRIPTION

Figure 1:
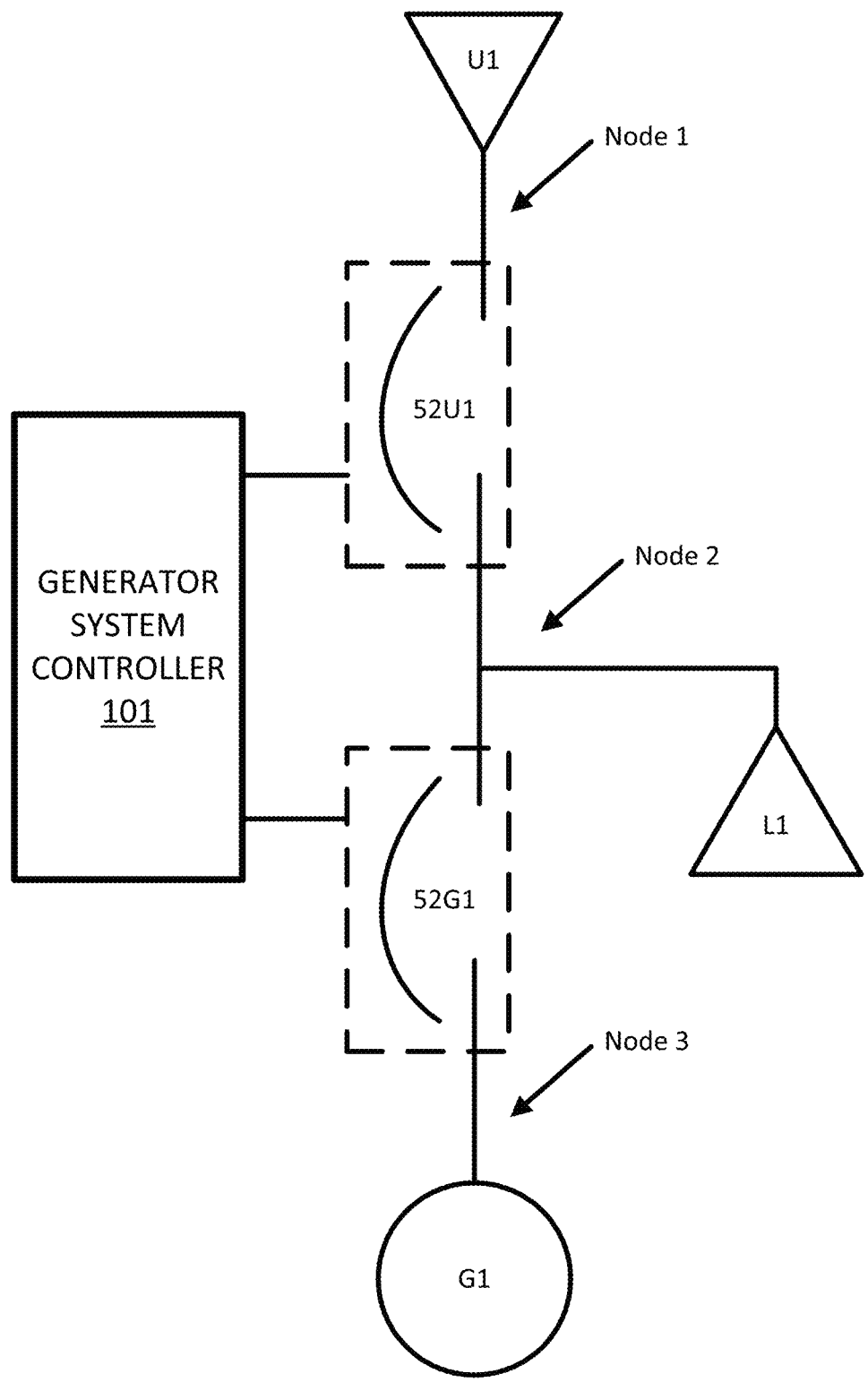
FIG. 1 illustrates an example generator system architecture for various operational sequences.

A generator system may include elements such as one or more generator sources, one or more utility sources, one or more power buses, one or more switching devices, and one or more load devices. A generator source is an apparatus that converts mechanical energy to electrical energy. The utility sources may include a connection to the power utility infrastructure or power grid provided by a utility company. Alternatively, the term utility source may refer to the utility itself. The power bus includes an electrical conductor (e.g., cable or bar) that transfers electrical power between components of the generator system. Components include at least one or more generator sources, one or more utility sources, and/or one or more load devices. The one or more load devices include apparatus for consuming or sinking power from the power bus. Example loads include lights, motors, or any electrical appliance. The switching devices are used to connect or disconnect the other components in the system to achieve the desired architectural layout to meet the operation requirements or user preferences and expectations. The switching devices may include circuit breakers, contactors or similar.

Each element may be defined according to properties or rules (requirements, priorities, constraints, conditions) that describe the operation of the element. Each element may be stored as a collection of properties. A system controller selects connections for the elements in order to meet the requirements of the loads by connecting one or more sources based on the properties or rules.

An example property for a load is that it is to be supplied with power whenever possible. The system controller attempts to provide the load from any available source available if at all possible. The system controller computes the desirability or preference ranking for feeding power to the load from each available source, so the load will be fed by the most preferred source that is available. Additional properties for the load may include the amount of power required by the load or a schedule for the power requirements and the relative priority of the load.

An example property for a generator source may be that the generator source only produces power when it is given a run signal. In other words, the system controller sends the run signal to the generator source before the generator source is available and produces power in response to the run signal. Another example property for a generator may be that it cannot start operating and will not be available when a problem or failure condition exists. For example, if the generator system controller receives a fault signal from the generator source, the system controller cannot send a run signal to the generator source until the fault is cleared. In this way, the system controller cannot attempt to transfer any load to a generator that is faulted. Similarly, if the generator source has registered a fault, the generator source cannot accept the run signal until the fault is cleared. The system controller may send a start signal to all generator sources that are needed to supply the system. This start signal will endure as long as the generator is needed and will be removed when a more desirable source becomes available for the load. Another example property may be the pre-alarm status. The system controller may receive a pre-alarm condition indicative of a high risk of a fault or another alarm. The system controller may attempt to find an alternate source to a generator if a pre-alarm condition occurs.

Another example property for a generator is that the voltage and frequency of the generator may be adjusted within the system to allow for synchronization. Example generator properties also include controllable real power, reactive power, power factor, current, and other characteristics of the generator. Additional properties for the generator source may include one or more power ratings for the generator source.

An example property for a utility source is that the utility source provides a constant voltage and frequency whenever possible and the voltage and frequency cannot be adjusted. Another property for the utility source is that the output of the utility source may be lost or become unavailable at any time. The term 'lost' refers to a temporary or permanent break in output of the utility source. The break in output may be a complete break (e.g., the output of the utility source goes to zero or substantially zero). The break in output may be a partial break that is substantial but not zero. The partial break in power may be less than a predetermined percentage of the expected output (e.g., less than 50%, 20% or 10%). Because the generator system can only control the frequency and voltage of generators, and cannot control the frequency and voltage of utilities, the generator system synchronizes generators to utilities, and may not synchronize utilities to generators.

An example property for a bus may be that the bus does not need to have power and does not need to be connected to a source. The bus provides connections between source elements and load elements. Other properties for a bus may include the maximum current it can support or the minimum economical current. An example property for a breaker is that the breaker is declared unable to open if the breaker fails to open after a certain number of attempts. Another example property for a breaker is that the breaker is declared unable to close if the breaker fails to close after a certain number of attempts.

A generator architecture layout describes the interrelated connections for the elements of the generator system. Data for the interrelated connections describes the manner in which each element of the generator system is connected to one or more other elements of the generator system. The interrelated connections may describe each of the switching devices of the generator system and the two or more elements brought into electrical connection or electrical disconnection by a switching device or a switching element such as a circuit breaker. Alternative to circuit breakers, switching devices or switching elements may include relays, contactors, vacuum fault interrupters, oil-immersed automated switches, automatic transfer switches, or manually operated switches and may be used to selectively connect or disconnect elements or devices in the system. Examples described herein using the term 'breaker' or 'circuit breaker' may be modified to include any combination of other switching devices or switching elements.

Relays and contactors are electrically controlled switches. Relays and contactors may include a main input and main output connected by a switch that selectively connects and disconnects according to a control input (e.g., control signal). The switch may include an electromagnet that is energized or de-energized by the control signal. A vacuum fault interrupter is a circuit breaker including a vacuum chamber between the contacts of the input and the output. The vacuum chamber interrupts the electrical arc between the contacts. Similarly, an oil-immersed automated switch is a circuit breaker including an oil-filled chamber between the contacts of the input and the output. The oil-filled chamber interrupts the electrical arc between the contacts.

The switches may be designated as manually operated. A manually operated switch may be used to connect or disconnect elements by manually moving the switch to change its position between closed or open. The generator system controller may detect the manual change and react accordingly.

An automatic transfer (ATS) switch may switch a load element between two source elements. The automatic transfer switch transfers the load between a generator source and a utility source, between multiple utility sources, or between multiple generator sources. The ATS may receive an input signal to switch the power supply for the load from one source to the other source, and vice versa. The ATS may receive an automatic input signal to switch the load from the generator to the other source based on an event such as generator failure or warning or utility failure or warning. The ATS may receive a signal to prevent transfer of a load to one source or another.

One or more switches may include position detection error reporting to determine when a switch is not really closed or not really open when it is instructed to be closed or open, respectively. A switch may include a position detector such as an electrical sensor for auxiliary contact or output signal. The system controller may measure current level through the switch or voltage levels on both sides of the switch. If the position detector of the switch indicates that the switch is open, but the system controller detects a substantial current through the switch, the switch is actually closed and the system controller may determine an error in the position detection. If the position detector of the switch indicates that the switch is closed, but the system controller detects voltage across the switch or voltage waveforms on opposite sides of the switch that indicate a difference in phase angle, the system controller indicates that the switch is actually open and determines an error in the position detection.

This difference is contingent on verification that the phase angle measurement is correct with the switch visibly closed. The determination may also be linked to a change in the phase angle or a difference in frequency or voltage.

The following embodiments address the situation in which one or more loads are supplied power by at least one utility source in one architecture arrangement and/or supplied power by at least one generator source in another architecture arrangement. Each of the utility source and the generator source may supply power to the one or more loads individually or in combination. The following embodiments control one or more circuit breakers in order to apply one architecture arrangement or another by selectively connecting or disconnecting the components of the generator system. The one or more breakers may be controlled according to characteristics of each of the components, a temporal variable for the utility source, and/or a temporal variable of the one or more loads. The following embodiments facilitate different system behavioral patterns in a variety of different system architectures without customized programming or re-programming to accommodate sequences of operation or architectures.

The characteristics of each of the components may include operational requirements for operation of the component. The operational requirements may include the amount of inputs essential to run the device, power supply necessities or other resources needed for operating the component. The operational requirements may include the resources required for maintenance of the components. The operational requirements may include a factor for the lifetime of the component. In addition, the operational requirements may include electrical interlocks, mechanical interlocks, recharge times, inhibit switches, circuit breaker control override switches, detected short circuits, detected loss of control of a component, current through the component, control limitations of the component, such as the ability to trip but not close, operation times for the component, and ease of component replacement, among other factors.

The temporal variable for the utility source may describe the variance in the cost or availability of the utility source. The utility source may vary based on time of day, day of week, time of year, and/or the utility source may vary according to relative demand. The temporal variable of the one or more loads may include the variance in the cost or availability of the utility source.

The temporal variable for a generator may describe variance in the cost of operation of the generator, the runtime hours on the generator, emissions regulations, generator efficiency, sound levels, location of the generator, time of day, level of fuel in supply reservoir, ambient temperature, output capacity of the generator, load on the system, reliability of the generator, the generator fuel type, or other factors.

In addition, example rules for paralleling components together, related to each component or each breaker, may specify no paralleling, short-term paralleling, temporary paralleling, or extended paralleling. Example rules for connection of components, related to each component or to each circuit breaker, may specify conditions such as one device dead or not energized, the other device dead, dead on both sides, live on both sides or never. Other rules for each component, such as desirability or priority of operation that may include rules for each disconnection device, such as lifetime operation cycles, speed of availability for each component, power capability of each device, number, type and control capability of loads connected to each component (for example, three shedable priorities and on life-safety priority). Example rules for preference of each source such as cost of operation, applicable regulations, environmental emissions, sound, difficulty of replacement, individual preference, importance of supplying power, age of component, or other factors related to each component.

The following embodiments also include an interface for entering or submitting the generator system architecture. The generator system architecture may be entered as a single line diagram or one-line diagram through an interface by a user. The single line diagram includes a notation for representing a power system. Each node or line in the single line diagram may correspond to a power bus. In other words, each node or line in the single line diagram represents the connections between components of the generator system. Each adjacent pair of components in the single line diagram may be electrically connected by a switch or breaker. From the single line diagram, multiple generator system architectures or functionality are identified depending on the settings of the breakers of the generator system. The user may enter characteristics for components of the generator system into the interface.

One or more rules or constraints may define a duration that one or more source elements can be connected to a bus or a load. A source may include a time value that defines how long the source can be tied to a particular type of load or any other element. For example, a first time value may correspond to another source, a second time value may correspond to a bus, or other examples. The time value may be variable depending on other elements that are connected to the system.

For example, consider a generator system including two generators feeding different busses. A constraint may state that the two busses cannot be electrically connected (i.e., a switch between the two busses cannot be closed) when both generators are running. The constraint prevents the situation in which both generators are connected to a bus when the bus fails and causes both generators to fail and accordingly, the entire system to fail.

In another example, consider a utility source that should not be connected to other sources because a source at the end of a utility feeder causes uncertainty for the utility. The utility source may be associated with a constraint that sets a time value for the utility source being connected to any other source, or a constraint that sets a time value for any of other source in the generator system.

Other system timing requirements may limit the connections of one or more source elements or one or more load elements to the generator architecture. The timing requirements may include a dead bus time, a paralleling time, a stability time, and/or loss time. Some timing requirements may define a minimum time while others may define a maximum time.

The dead bus time defines a time period for a transfer sequence. The transfer sequence may be an open transition delay, a sequenced transition, or a closed transition.

The sequenced transition may occur over a relatively small time period such as less than 100 ms, 500 milliseconds, or less than 1 second. The sequenced transition may be a break-before-make transition with a delay corresponding to a brief power interruption that is noticeable to people (e.g., lights flickering or blinking) or noticeable to sensitive loads such as electronic equipment. The sequenced transition delay may be insignificant to other loads such as inductive loads or resistive heating loads.

An open transition delay constraint applied to a source element or a load element means that the load element is disconnected from one source element for a period of time before being connected to another source element; i.e. the open transition delay elapses before the load element is connected to a subsequent source.

The open transition constraint applied to a source element or a load element also provides a break-before-make sequence, meaning that the load element is disconnected from one source element, an open transition delay elapses, and the load element is connected to a subsequent source. The open transition delay may be a time period such as longer than 1 second. Example time periods may include 5 seconds, 10 seconds, 30 seconds, or longer. The open transition delay may be long enough to provide time for inductive loads such as electric motors to spin down after the source element is disconnected from the load. The transition delay prevents re-energizing inductive loads that can cause surges that can trip protective devices or damage the inductive load devices. The transition delay may also prevent errors in uninterruptible power systems (UPS) or other devices that may switch to a backup power source independently of the generator system.

The paralleling time defines a time period when multiple sources are electrically connected together. The paralleling time may provide constraints for a fast transition, a soft transition, or extended paralleling. The paralleling time is for closed transition delay periods for a make-before-break sequence in which the first source element remains connected to the load until the second source element is also connected. When both source elements are connected to the load, the first source element is disconnected. The first and second source elements are maintained in continuity or in a state of no power supply interruption. The constraint for the fast transition states that the two sources connect to the load based on a maximum parallel time for the sources.

The constraint for a soft transition delay period or a brief paralleling mode may include a time period of a few seconds (e.g., 2 seconds to 30 seconds). The constraint for a soft transition delay period may be applied to a utility source or a generator source. As an example, a load device is connected to a first source element through a bus. After a synchronizing sequence, a second source is connected to the same bus. The load is transferred from the first source to the second source in a ramping fashion over the transition delay time, such that there is no load on the first source and the second source has assumed all the load. At this point, the first source may be disconnected from the bus. The constraint for a soft transition delay period may be applied in either direction, from a generator source or from a utility source or to a utility source to a generator source.

The stability time defines a time period constraint that may be applied to a generator source or a utility source. The stability time may define a time period during which a set of criteria such as acceptable voltage and acceptable frequency must be satisfied before the source element is designated as stable. In other words, the generator system may not make a decision regarding a connection to a source element until the stability time period for the source element has passed. For example, when a source element is connected to a bus or a load, no subsequent switches are connected or disconnected until the stability time period has passed. The stability time for a generator source may be relative low such as about 1 second, and the stability time for a utility source may be relative high such as a 10 seconds or more. The stability time period for the utility source may be designed to exceed intermittent losses caused by weather (e.g., a branch blowing against and away from a power line). The stability time period for utility may also be influenced by coordination with upstream devices such as automatic reclosers and sectionalizers.

One or more other rules or constraints may overrule or supersede one or more or all of the timing requirement constraints. For example, a source valid constraint may state that if only one source element is connected in the generator system, that source is used. In response to the source valid delay constraint, the generator system may temporarily ignore any other timing requirements and close the sole source element to the load element.

A source loss constraint may define a timing requirement for designating a source element as disconnected or failed. For example, a time value may be a waiting period after a source element is nonresponsive or no longer supplying power above a minimum threshold. When the time value elapses without the source element returning to normal operation, the generator system designates the source element as disconnected or failed.

Any or all of the timing requirements may be adjusted based on the type of element and within any element, multiple values are possible. For example, there may be a connection permitted time constraint that defines an amount of that the element may be connected to the generator system. A generator element may be associated with a short timing requirement, a long timing requirement, or an extended timing requirement, which may be listed in seconds. A utility element may be associated with a short timing requirement, a long timing requirement, or an extended timing requirement, which may be listed in seconds. A load element may be associated with a short timing requirement, a long timing requirement, or an extended timing requirement, which may be listed in seconds. A bus element may be associated with a short timing requirement, a long timing requirement, or an extended timing requirement, which may be listed in seconds.

A priority constraint may be applied to any generator system or to types of source elements. The priority constraint may specify an order or preference value for types of source elements (i.e., utility sources are preferred over generator sources, or generator sources are preferred over utility sources). The priority constraint may specify an order for individual source elements (i.e., U1 is preferred over U2, which is preferred over G1, which is preferred over G2). In these examples, the priority constraints define orders for a priority of source elements. When more than one source is available, the priority constraint may influence the choice of one source connection over another.

The priority constraint may also apply a bias to a comparison of the costs between source elements. As described in more detail below, source elements may be applied to costs related to acquisition, maintenance, and/or operation. The priority sequence constraint may specify a value that is added to the cost. Thus, if a utility source and a generator source are associated with the same or similar costs, and the priority constraint specifies a bias value for generator sources, the utility source will be preferred over the generator source.

The priority constraint may also include rules for connecting to a dead bus, which may be referred to as a dead bus constraint. A dead bus is a bus with no source elements connected and providing power. Dead bus condition may be verified by measurement of electric potential. Abnormally occurring voltage or absence of voltage may result in a notification to an end user or information stored to a non-volatile or volatile medium.

The dead bus constraint for each source element may specify whether or not the source element can be closed to a dead bus. The dead bus constraint for the generator system may determine whether or not any source element may be closed to a dead bus. The dead bus constraint may include a different rule for each of multiple scenarios including a condition that source element 1 is dead and source element 2 is dead, a condition that source element 1 is dead and source element 2 is live, a condition that source element 1 is live and source element 2 is dead, and a condition that both source element 1 and source element 2 are live.

A load priority constraint may be applied to any generator system or to types of load elements. The load priority constraint may specify an order for types of load elements. Types of load elements may include resistive loads, inductive loads, capacitive loads, or non-linear loads. Resistive loads may include currents proportional to the voltage. Resistive loads may include incandescent lighting and resistive heaters. Inductive loads may include loads with high inrush currents and lower steady state currents such as motors, transformers, and wound control gears. Capacitive loads may include leading currents where currents reach peak before the voltage. Capacitive loads may include capacitor banks. Non-linear loads may be loads where the voltage and current are related through a complex relationship, typically involving switching elements.

The load priority constraint may specify the order for connecting load elements to the bus. When the generator system includes source elements that can supply less than the power needed by the load elements, the load priority constraint defines which load elements are connected and the preferred order of connection. The load priority constraint may indicate that inductive loads are connected first, then capacitive loads are connected, and then resistive loads are connected. An example collection of loads and priorities may include emergency lighting and ventilation as high priority to be connected first, heating and cooling as medium priorities to be connected next, and exterior lighting and convenience receptacles as low priority to be connected last, and entertainment circuits as very low priority to remain unconnected.

External factors or costs may be applied to utility source elements or generator source elements. The external factors for a utility source may include a purchase cost of electricity from the utility provider (e.g., cost per kilowatt-hour). The external factors for a generator source may include a purchase cost of fuel for the generator. The external factors may be variable or defined as a function of another parameter. For example, the price of fuel may change over time such as from season to season or time of day.

External factors or costs may include sound cost and/or desirability and emissions cost and/or desirability. A sound constraint may be selected according to sound cost and/or the sound desirability of the user. A sound cost is a value associated with the amount of sound produced by the element. A user may designate the weighted influence of sound, which is combined with the sound cost value for the sound produced by the element. An emission cost is a value indicative of an amount of emission (e.g., exhaust gas, or carbon footprint) produced by the element. An emissions constraint may be selected according to the emission desirability of the user. That is, a user may designate the weighted includes of emissions, which is combined with the emission cost value for emission produced by the element. A desirability factor may be a subjective preference determined only by user personality and like or dislike of certain characteristics. For example a user may dislike the smell of diesel exhaust and may give higher preference to other sources.

External factors or costs may include a replacement cost, a maintenance fixed cost and/or maintenance variable costs. The replacement cost is a cost to replace a source element, a switching element, or a distribution element. The replacement cost may be annualized or prorated over another time unit. The maintenance fixed cost may include regular maintenance such as safety inspections. The maintenance variable costs, or costs per operation may include consumables such as oil, oil filters, air filters, or belts and labor costs for the changing these components.

Electrical parameter constraints may be included in the generator system. The electrical parameter constraints may be defined based on the load elements and source elements. Other elements may be selected or excluded based on matching to the generator system based on the electrical constraints. The electrical parameter constraints may include voltage regulation constraints, frequency regulation constraints, phase regulation constraints or phase rotation constraints.

As an example, a voltage regulation constraint for a load element may specify that the voltage applied to the load element must be within a predetermined percentage of a rated level at all times. Thus, a maximum droop (decrease) of the voltage level must not exceed the predetermined percentage below the rated level. Thus, when selecting a source element to provide power to this load element, the generator system selects sources that do not fluctuate by more than the predetermined percentage or elements that are not expected to fluctuate more than the predetermined percentage with the addition of the expected power requirement of the load element. Similar constraints may be applied to phase or frequency.

Other constraints on the generator system may include fault threshold for any element (e.g., source element, load element, switch element, or distribution element). The fault threshold may be a current fault threshold, a phase angle fault threshold, or a power dissipation at full load. Other constraints on the generator system may include a switch desirability for closed position or a switch desirability for open position. Other constraints for a source element of the generator system may include a number of rated cycles at no-load or a number of rated cycles at full load.

One or more failure handling rules may be applied to the generator system architecture. A fault or an unexpected change in the generator system may instigate a change in the layout. A failure of a source, either a generator source or a utility source, may mean the remaining sources are no longer able to provide adequate power to the load. Thus, any time a failure occurs, the generator system reevaluates the connections in the layout.

In addition, unexpected changes such as manual changes to a switch element may trigger a similar re-evaluation of the connections in the generator architecture. A manual change occurs when a user changes the setting of a switch element by hand, or electronically instructs the switch element to change position. The manual change may include any change that occurs outside the control of the generator system controller.

FIG. 1 illustrates a generator system including a utility source U1, a load L1, and a generator source G1. Each of the breakers is configured to electrically connect one or more loads to the at least one source. A breaker 52U1 selectively connects and disconnects the utility source U1 to and from the load L1. A breaker 52G1 selectively connects and disconnects the generator source G1 to and from the load L1. A generator system controller 101 is configured to control breaker 52U1 and breaker 52G1. Additional, different, or fewer components may be included.

One or more of the components in the generator system may be configured to operate based on rules. The rules may be configured to be adjustable based on settings, system layout, user preference, applicable regulation, stored configuration, external logic and other factors related to the system and application. The components may have fixed rules that are not user adjustable. For example, a utility source may have the rule that it is not controlled by the generator system controller. As another example, a load may be assigned a rule that it is to be fed with power whenever possible. Further examples may include a bus assigned a rule that it does not need to have power, a generator will only make power when it is given a run signal from the system controller, a generator cannot be started when faulted, and no more than one circuit breaker may be closed at any time.

The generator system controller 101 may include one or more memories or registries for storing a generator architecture layout that describes the interrelated connections for the utility source U1, the load L1, breaker 52U1, breaker 52G1, and the generator source G1. Various combinations of the components may be used. At least one of the available layouts may include at least one breaker, at least one bus, at least one load connection and at least one utility connection in addition to the at least one generator.

The generator architecture layout may include a table (e.g., Table 1) including the interrelated connections for each component of the generator system. Each row, or column, of the table may include an identifier for a breaker of the generator system and at least two components connected to the breaker. For example, Table 1 below includes a first row of data that associates a first breaker (e.g., breaker 52U1) with a first component (e.g., utility source U1) and a second component (e.g., load L1) and a second row of data that associates a second breaker (e.g., breaker 52G1) with another first component (e.g., generator source G1) and the second component (e.g., load L1). Table 1 illustrates that load L1 is connected to utility source U1 through breaker 52U1 and that load L1 is connected to generator source G1 through breaker 52G1.

TABLE 1

| Breaker | First Component | Second Component |
|---------|-----------------|------------------|
| 52U1    | U1              | L1               |
| 52G1    | G1              | L1               |

In another example, the generator architecture layout may include a table (e.g., Table 2) including each of the components connected at a particular node of the layout. Each row, or column, of the table may include an identifier for the one or more breakers, one or more sources, and/or one or more loads connected at the node. Table 2 illustrates three nodes, describing the layout of FIG. 1.

TABLE 2

| Node 1 | U1   | 52U1 |    |
|--------|------|------|----|
| Node 2 | 52U1 | 52G1 | L1 |
| Node 3 | 52G1 | G1   |    |

From either Table 1 or Table 2 the generator system controller 101 may determine the one or more layouts that are capable of supplying power to the load L1. In other words, the generator system controller 101 may access the layouts as described by Table 1 or Table 2 from memory. For each layout, the generator system controller 101 may calculate sum of powers for the sources available in the layout and compare the power sum for the sources to the power required by the load. Table 3 illustrates in row that in a first layout only utility source U1 is connected to the load, which corresponds to a power sum of A. In a second layout, only generator source G1 is connected to the load, which corresponds to a power sum of B. In a third layout both the utility source U1 and generator source G1 are connected to the load, which corresponds to a power sum of C. The generator system controller 101 may compare each of the power sums to the required load power P. In this example, the required load power P is less than A; and load L1 can be met or supplied by utility source U1 alone. This may be designated by a high bit or signal. The required load power P is greater than B and cannot be supplied by generator source G1 alone. This may be designated by a low bit or signal. The required load power P is less than C and can be met or supplied by the combination of U1 and G1; which too may be designated by a high bit or signal. From either Table 3 the generator system controller 101 may determine or access from memory the one or more layouts that are capable of supplying the load L1.

TABLE 3

| U1 | G1 | Power Sum     | Load Power (P) for L1 |
|----|----|---------------|------------------------|
| X  |    | U1 = A        | P < A = high           |
|    | X  | G1 = B        | P > B = low            |
| X  | X  | U1 + G1 = C   | P < C = high           |

The generator system controller 101 may access a priority setting for the at least one generator system from memory. The priority setting may include a priority factor or optimization factor for selection of the system layout. The priority factor or optimization factor describes an order for the impact of one or more operational quantities of the system layout. For example, the system layout impacts the operational costs. The operational quantities may include an input requirement, a maintenance requirement and/or an environment impact. The priority setting may prioritize input requirements as the top priority. The priority setting may prioritize maintenance requirements as the top priority. The priority setting may prioritize environment requirements as the top requirement. The priority setting may prioritize input requirements then maintenance requirement and then environmental requirements or another predetermined order. The requirements assigned the highest priority may be a top priority, the requirements assigned the next highest priority may be a secondary priority, the requirements assigned the next highest priority may be a tertiary priority, and so on. The generator system controller 101 may calculate at least one operational quantity for each of the layouts according to the priority setting. The priority setting may include a coefficient for each of the input requirements, the maintenance requirements and/or the environment impact in order to sum or average the values into an aggregate value.

The input requirement may include resources for acquisition of the component or corresponding device implementing the component or ongoing inputs to the device. The acquisition of the device may include the cost of the device (e.g., cost of a generator, a breaker, or a utility connection) or the time involved in installation of the device. The inputs to the device may include a power consumption or energy value (e.g., kilowatt hour, joule, or another energy unit) that represents the usage costs of the device. For utilities, the inputs may be described by the cost of power. For generators, the inputs may include a volume of fuel or a cost of fuel. The power consumption or energy value may change over time. An input cost may include a cost during periods of non-use, such as a cost to operate a block heater or a display panel for a generator.

The maintenance requirement may include resources for the upkeep or maintenance of the device. The maintenance requirement may include the cost of mechanical maintenance (e.g., oil changes, filter replacements, or other consumables). The maintenance requirement may include the cost of a custodian or mechanic for maintaining the device.

The environmental impact may include the costs to the environment around the device. In the case of generators, the environment impact may include a value proportional to the noise produced by the generator, a value related to the risk of a leak of oil, fuel, or another chemical into the environment, or the greenhouse gas or other emissions from the engine's normal operation.

Table 4 illustrates an example lookup table stored in memory by the generator system controller 101 for the inputs of a source device. The coefficients for the input requirements ($I_n$), the maintenance requirement ($M_n$), and the environmental impact ($E_n$) may be combined to calculate an aggregate input cost of the device. The coefficients may be summed or averaged to determine the aggregate input cost of the device.

TABLE 4

| Source | Input Requirement | Maintenance Requirement | Environmental Impact |
|--------|-------------------|-------------------------|----------------------|
| U1     | $I_1$             | $M_1$                   | $E_1$                |
| G1     | $I_2$             | $M_2$                   | $E_2$                |

Table 5 illustrates another example lookup table for devices of the generator system which may be used in combination or as an alternative to Table 4. Each device in the generator system of FIG. 1 is described in a row of the lookup table of Table 5. Each device may be associated with a transition requirement, a maintenance requirement, and an aggregate requirement. The transition requirement may include resources or costs associated with transition of the device from an off state to an on state or vice versa. For example, the transition requirement for a breaker may include the energy required to open or close the breaker. The energy required to open or close the breaker may be the energy required to drive a stepper motor, solenoid, lever or other device that brings contacts in and out of contact. In another example, the energy to open or close the breaker may be stored in an energy storage device (e.g., a spring) that stores the energy until the contacts are brought in or out of contact. Energy may be transferred to the spring by a motor, hand crank or another mechanical device. The transition requirement for a generator may include the fuel needed to bring the generator operational and connect the generator to the bus. The transition cost for a utility may include the fixed costs for connecting the generator system to the utility.

The maintenance requirements, as described above, may include the costs of maintenance for the device. While for generators, the maintenance requirement may incorporate oil changes, filter replacements, or other consumables. The maintenance requirements for breakers 52U1 and 52G1 may include a replacement of the breakers after a predetermined usage (e.g., a predetermined number of cycles of the breaker or a predetermined time of a load provided through the breaker). In some scenarios, breakers may be subjected to increased wear, and accordingly higher maintenance requirements, when a high current passes through the breaker. For example, when a current is a predetermined number (e.g., 25) times the rated current, an arc may be created when opening or closing the breaker. The arc subjects the breaker to increased electrical wear and mechanical wear.

Another cost of a breaker may be based on a circuit topology. In some situations, two breakers may be arranged in parallel or in a loop. One of the breakers may be the preferred breaker for the components in the loop or the parallel connection. Another breaker (e.g., complementary or alternate breaker) may be assigned a high cost to prevent closing of the other breaker unless the first breaker is subject to a failure or other unexpected scenario. Other maintenance costs for the breaker are possible.

The maintenance requirement for the bus B1 may include the cost for replacement of the bus. The usage requirements of the bus may include energy lost through normal operation of the bus. Energy may be lost to heat. The loss of heat may be determined as a function of a length of the bus. The maintenance requirement may include the cost of a custodian or mechanic for maintaining the device. Other maintenance costs for the bus are possible.

The aggregate requirement may include an arithmetic combination of the maintenance requirement and the transition requirement. For example, the maintenance requirement and the transition requirement may be summed, or each of the requirement values may be first multiplied by a coefficient and then summed together.

TABLE 5

| Component | Transition Requirement | Maintenance Requirement | Aggregate Requirement |
|---|---|---|---|
| U1 | $T_1$ | $M_1$ | $A_1$ |
| G1 | $T_2$ | $M_2$ | $A_2$ |
| 52U1 | $T_3$ | $M_3$ | $A_3$ |
| 52G1 | $T_4$ | $M_4$ | $A_4$ |

From Table 3 the generator system controller 101 may determine the one or more layouts that are capable of supplying the load L1. From Table 4 and/or Table 5 the generator system controller 101 may determine the operation requirements for the capable layouts and perform a comparison of the capable layouts to identify one or more with the lowest operational requirements according to the priority setting of the generator system. The priority setting may minimize environmental concerns such as noise, initial startup costs, ongoing costs, or maintenance costs in any order. The generator system controller 101 may select a preferred layout from the capable layouts based on the comparison.

The generator system controller 101 may determine a generator system command to implement the preferred layout. The generator system command may include at least one breaker setting for opening or closing a breaker to bring a component in or out of electrical connection with another component of the generator system. The generator system command may include an instruction to turn on or off a generator. The generator system command to change the speed of a generator or change the output of a generator. The generator system command may shed or add a load to the generator system.

In one example, the generator system controller 101 may store a device identifier that describes the type of device (e.g., generator, breaker, bus, load, utility or another device). For example, the device identifier is a value that corresponds to a type of device for each of the multiple components. In another example, the generator system controller 101 may not rigidly define types of devices but instead define one or more of the devices of the generator system according to characteristics of the device. Example characteristics may include whether or not the device is controllable, a power rating of the device (e.g., a maximum power level or a hypothetical infinite power level, whether or not a startup time is required, whether or not interruptions are acceptable, power requirements, and/or a function of the device.) Using these characteristics or others any type of device, not limited to generators, breakers, busses, loads and utilities may be described.

For example, the characteristics of a generator may include a controllability characteristic that indicates that the generator is controllable (e.g. has variable voltage and frequency), a maximum power level of the output of the generator, a startup time required from zero revolutions per minute to rated speed (e.g., 60 Hz) and a source characteristic identifying the generator as a power source.

Example characteristics of a utility may include an indication of infinite power level a hypothetically infinite power level, an indication that the utility is not controllable (e.g. has fixed voltage and frequency), and a source characteristics identifying the utility as a power source.

The characteristics of a bus may include a list of the devices that are fixedly connected by the bus. The characteristics of a breaker may include a list of the devices that may be selectively connected by the breaker.

Figure 2:
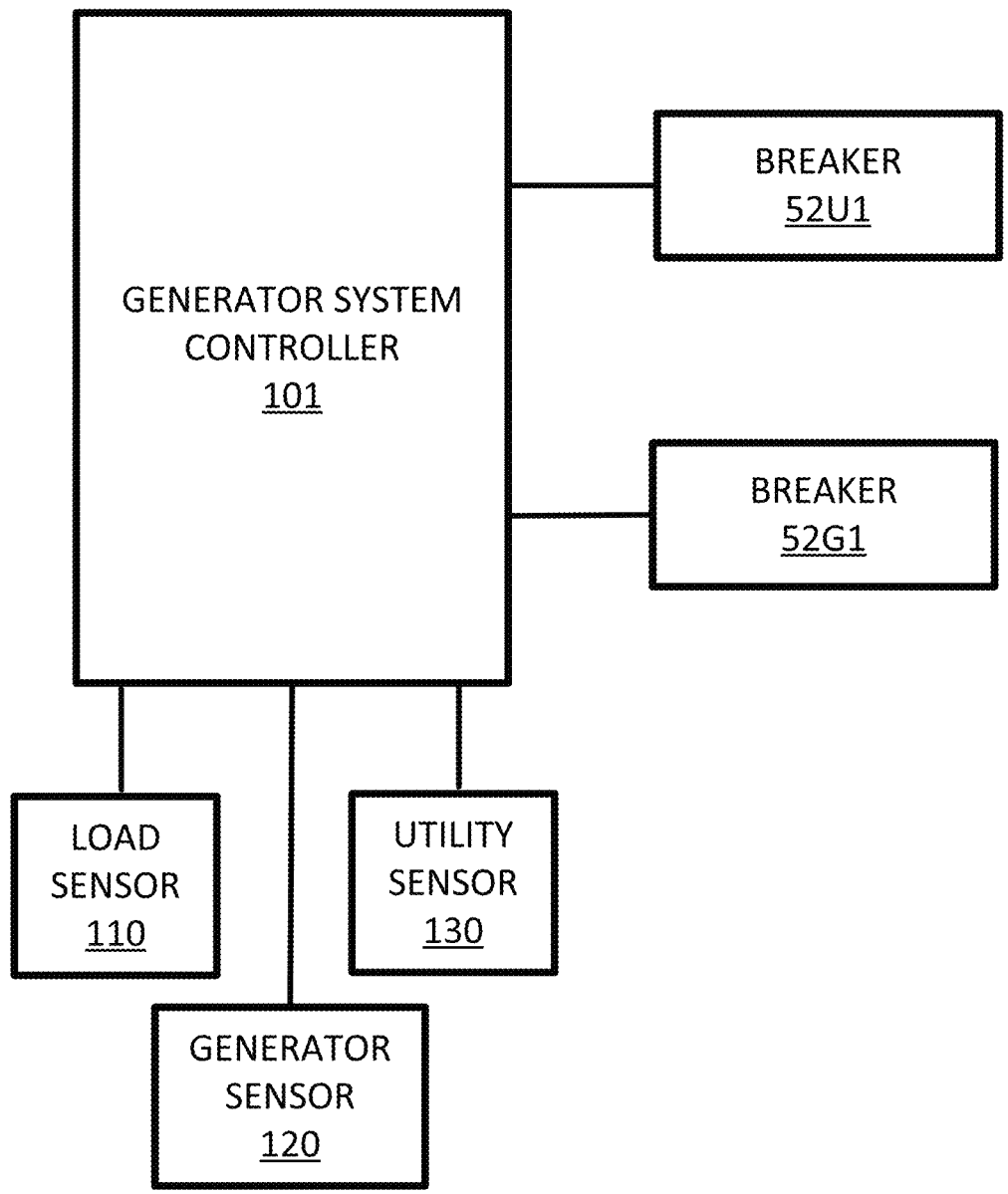
FIG. 2 illustrates an example control system for the example generator system of FIG. 1.

FIG. 2 illustrates an example control system for the example generator system of FIG. 1. The generator system controller 101 may be coupled with and in communication with a sensor array, including one or more of a load sensor 110, a generator sensor 120, and a utility sensor 130. The generator system controller 101 may be coupled with and in communication with a breaker array (e.g., breaker 52U1 and breaker 52G1). The generator system controller 101 may be configured to generate commands for opening or closing the breakers.

The load sensor 110 may detect an electrical requirement of the load. The electrical requirement may be a voltage or current level being drawn by the load. The load sensor 110 may be an inductive sensor that detects a magnetic field on a cable connected to the load. The load sensor 110 may detect the existence of the load. That is, the output of the load sensor 110 may be on or off. The load sensor 110 may detect a setting of the apparatus placing the load on the generator system. For example, the load sensor 110 may determine whether a light or a fan is set at low, medium or high.

The generator sensor 120 may detect an electrical output of the generator. The electrical output may be a voltage level or a current level output from the generator. The generator sensor 120 may be a voltage sensor, a current sensor, or an inductive sensor. Alternatively, the generator sensor 120 may detect a rotation of a shaft of the generator.

The utility sensor 130 may detect whether the utility is in operation or not in operation. The utility sensor 130 may detect an electrical output of the utility, which also may be a voltage or current level being drawn from the utility.

Referring back to Table 1, the generator system controller 101 determines that two potential generator system layouts are capable of supplying adequate power to the load. One of the adequate generator system layouts includes utility source U1 and the other adequate generator system layouts includes generator source G1 and utility source U1. In this scenario, it is clear than the resources required to connect the utility source U1 will be less than required to connect both the utility source U1 and the generator source G1. Nonetheless, generator system controller 101 is configured to calculate the aggregate requirements of utility source U1 and calculate the aggregate requirements of the combination of the utility source U1 and the generator source G1.

Figure 3:
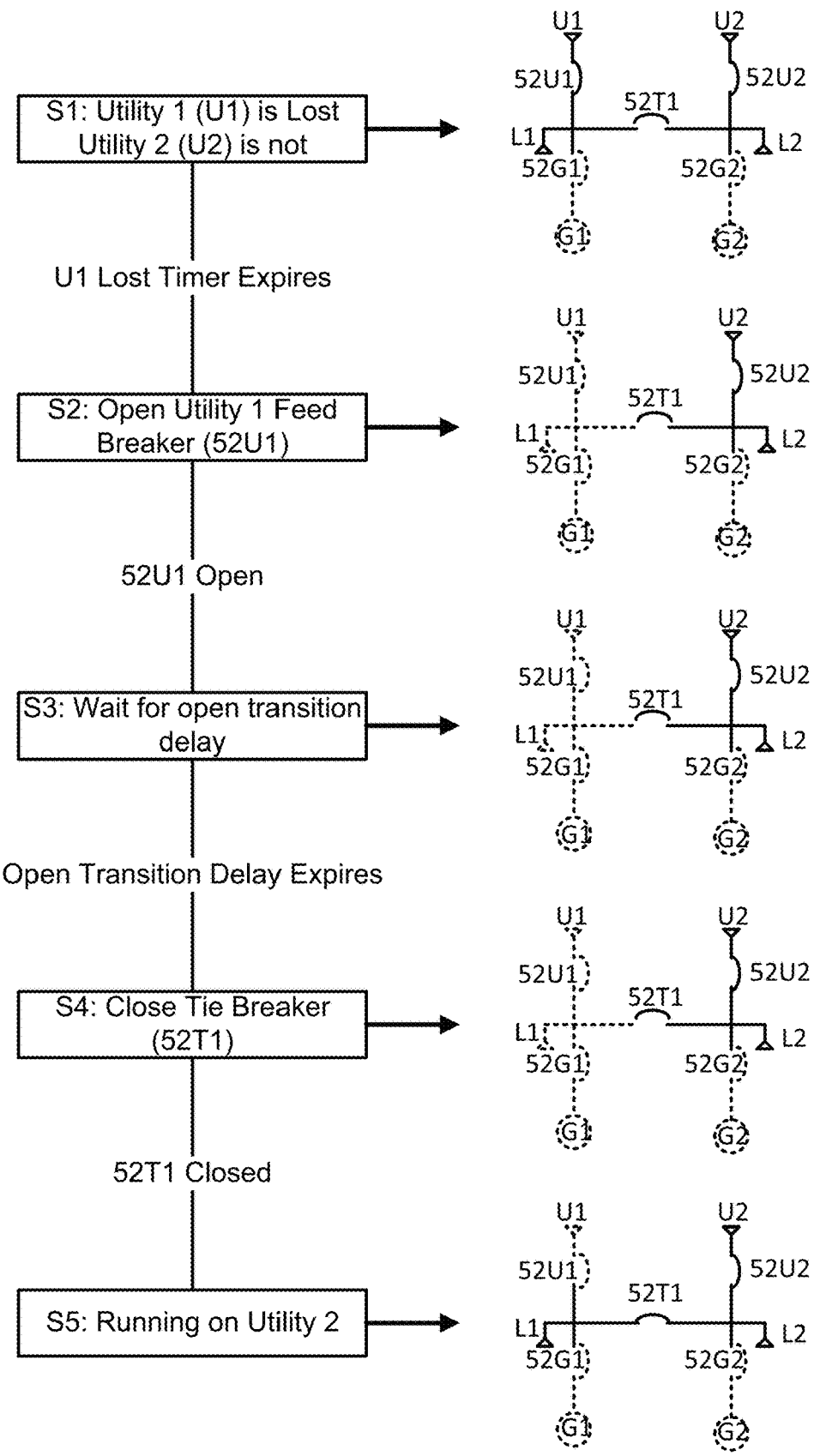
FIG. 3 illustrates an example operational sequence.
Figure 4:
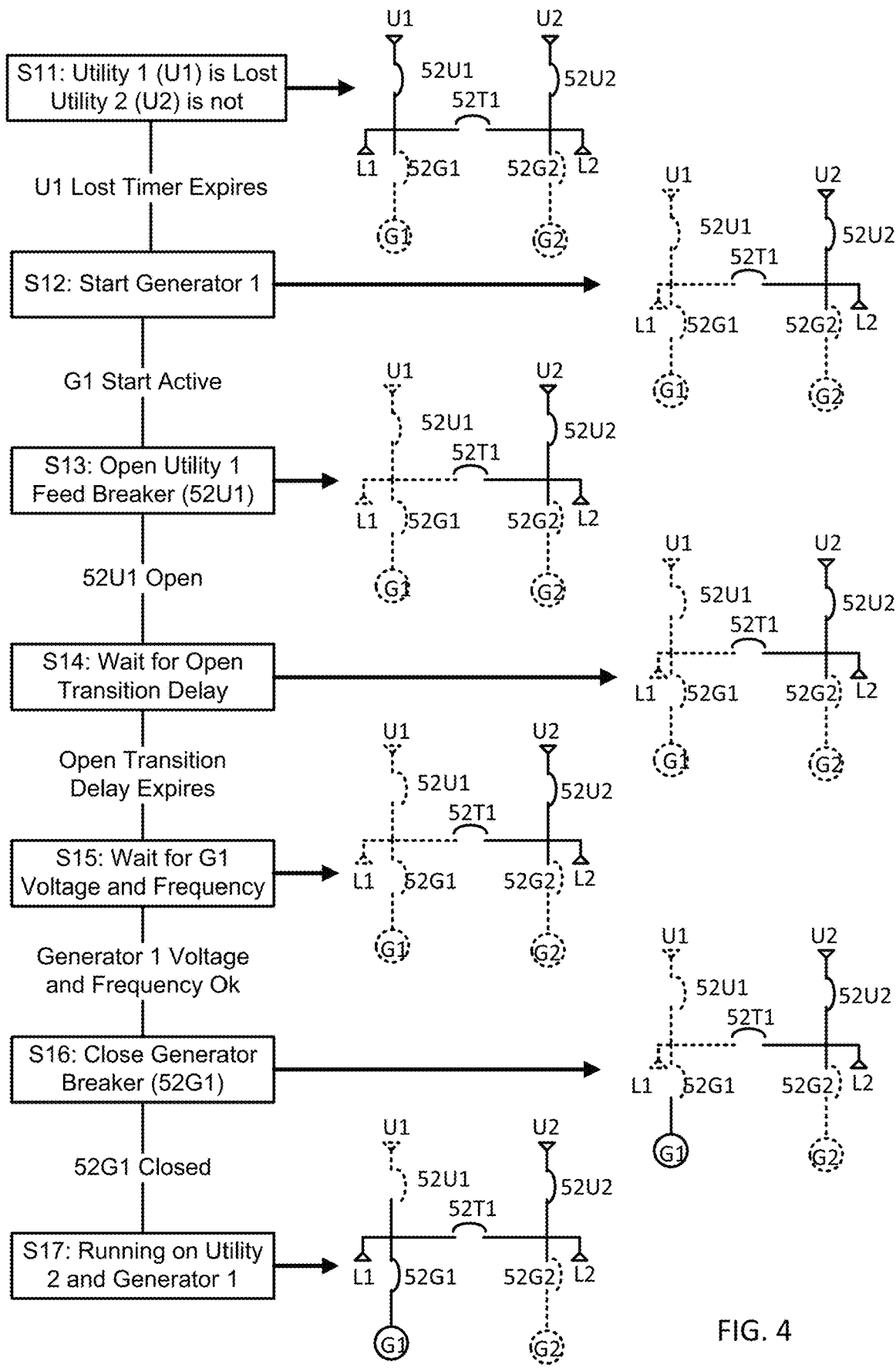
FIG. 4 illustrates another example operational sequence.
Figure 5:
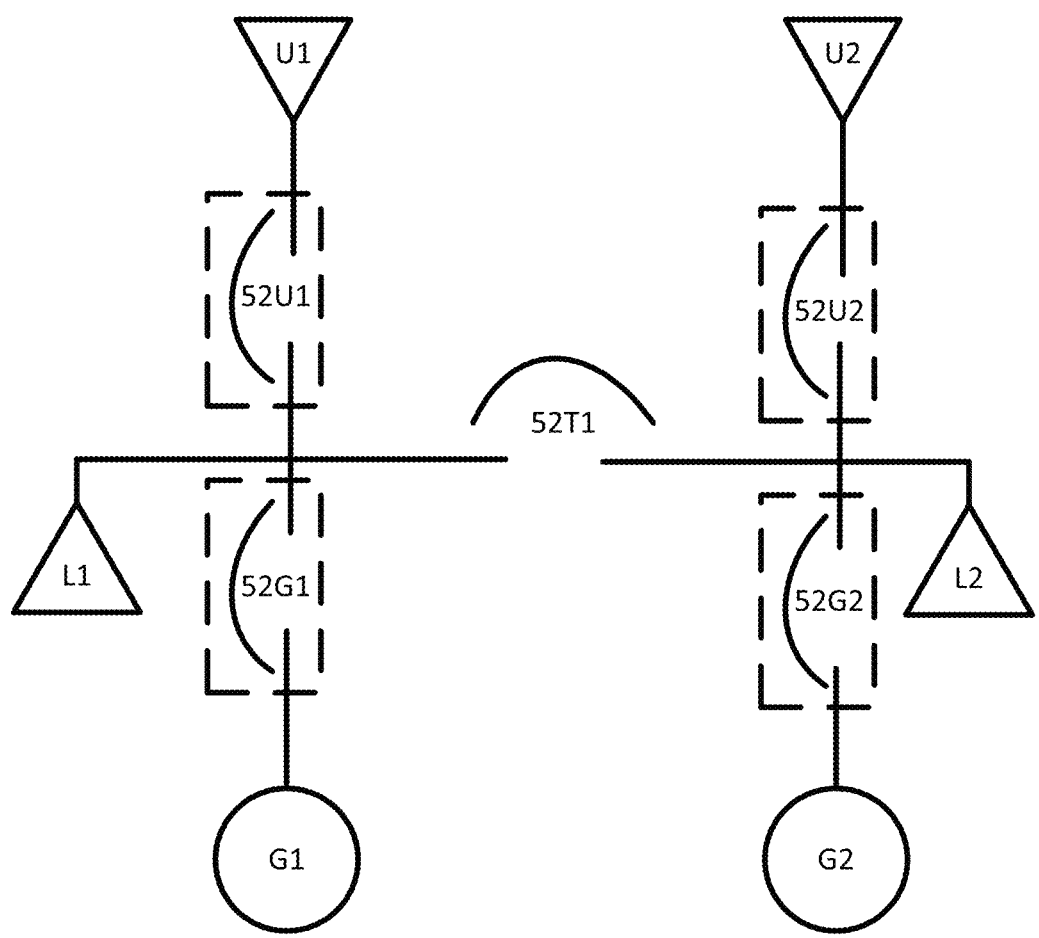
FIG. 5 illustrates an example generator system architecture for a number of different operational sequences.

FIGS. 3 and 4 illustrate an example operational sequence for the generator system as a utility source fails. FIG. 5 is a generator system for the operational sequences of FIGS. 3 and 4. The generator system includes a first utility source U1, a second utility source U2, a first load L1, a second load L2, a first generator source G1, and a second generator source G2. A series of switch elements or breakers 52U1, 52U2, 52G1, and 52G2 are configured to selectively connect any of the preceding components to any one or more other components in the generator system. A tie breaker 52T1 selectively ties the loads together. Thus, either, none or both of the utility sources, and either, none or both of the generator sources may be connected to either, none or both of the loads. The generator system controller 101 is configured to control the breakers. Additional, different, or fewer components may be included.

In FIG. 3, the total of the load elements is supplied by a utility source, and in FIG. 4, a generator source element is needed to supply the total load. In other words, FIGS. 3 and 4 illustrate two different scenarios that could be selected according to the rules and constraints described herein, which may be applied to different system or to the same system at different times or circumstances. FIGS. 3 and 4 also illustrate circuits corresponding to each stage of the sequence. In the circuits, live portions of the circuit (conducting portions) are illustrated with solid lines and dead portions (non-conducting portions) are illustrated with dotted lines.

At S1, the utility source U1 is lost or stops providing power to the loads. U1 may have been lost of because of a malfunction or an intentional disconnection. The generator system controller 101 determines that additional sources are needed based on the requirements of the loads. The availability of other sources may be determined using the techniques described herein with respect to Table 1 and/or Table 2. The generator system controller 101 determines what other sources are capable of providing power to the loads using techniques described herein with respect to Table 3. The generator system controller 101 may compare any of the costs described herein among multiple available sources. Because the power requirements of the loads exceed the power sum of the remaining source elements (e.g., U2), the generator system controller 101 identifies that utility source U2 is sufficient to supply power to both loads and can do so at the lowest cost. The following sequence describe example steps for transitioning the loads to utility source U2.

At S2, the U1 feed breaker 52U1 is opened. The generator system controller 101 also accesses the rules and/or constraints associated with the utility source U1 or the U1 feed breaker 52U1. The utility source U1 for the feed breaker 52U1 is associated with the timing requirement for an open delay transition period. At S3, the open delay transition period is waited. The generator system controller 101 determines the delay time and waits the delay time before issuing any commands for any switches of the system.

At S4, the tie breaker 52T1 is closed in response to the expiry of the open delay transition period. At S5, the system provides power to the loads solely from utility U2.

Similar sequences may be applied by the generator system controller 101 when load requirement changes, loads are added to the system, sources are added to the system, or any change in the capabilities of a source.

FIG. 4 illustrates another operational sequence with the same catalyst, a utility that stops providing power to the load. At S11, the utility source U1 is lost or stops providing power to the loads. The generator system controller 101 determines that additional sources are needed based on the requirements of the loads. The availability of other sources may be determined using the techniques described herein with respect to Table 1 and/or Table 2.

The generator system controller 101 determines what other sources are capable of providing power to the loads using techniques described herein with respect to Table 3. The generator system controller 101 compares the costs of available sources and determines that generator G1 is the lowest cost source suitable to apply the power required by the loads and under the constraints of the system. The following sequence describe example steps for transitioning the loads generator G1.

At S12, generator G1 is started in response to the determination that generator G1 is the lowest cost source suitable to apply the power required by the loads and under the constraints of the system. At S13, the U1 feed breaker 52U1 is opened. The generator system controller 101 determines that an open delay transition period is required by the utility source U1, or another element of the system. At S14, the open delay transition period is waited by the generator system controller 101.

The generator system controller 101 also accesses stability constraints for generator G1 and determines that generator G1 should not be closed to the bus until a predetermined voltage and a predetermined frequency is reached by the generator G1. At S15, the voltage and frequency for G1 is waited. In response to the actual voltage of the generator G1 and the actual frequency of the generator G1 reaching the threshold set by the constraint, the generator system controller 101, at S16, closes the generator breaker 52G1. Finally, after the generator breaker 52G1 is closed, the loads are running on utility U2 and generator G1, as shown by S17.

FIG. 5 illustrates the example generator system for the operational sequences of FIGS. 3 and 4. One priority constraint may require both loads to have at least one power source, connected in parallel or separated. Another paralleling constraint may require the utility sources not be connected together, by tie breaker 52T1 in this case. The following describes a sequence for identifying what source elements are sufficient to supply power required by the loads. Depending on the power required by the loads, some of the generator system layouts are capable of supplying the required power and others are not. For example, as shown by Table 6, when only load L1 is connected, represented by a power requirement of $X_1$, the second generator source G2 is not capable to supply the required power alone. However, any other source (U1, U2, or G1) is capable of supplying the required power, either alone or in combination with another.

Also shown by Table 6, when only load L2 is connected, represented by a power requirement of $X_2$, neither of the first generator source G1 or the second generator source G2 is capable to supply the required power alone or in combination. However, with the help of either utility source (U1 or U2), the generator system is capable of supplying the required power, either alone or in combination with either of the generator sources.

Also shown by Table 6, when both load L1 and L2 are connected, represented by a power requirement of $X_{12}$, neither of the first generator source G1, the second generator source G2, or the first utility source U1 is capable to supply the required power alone. However, any combination of the first utility source U1 with the first generator source G1 or any combination including the second utility source U2 is sufficient to supply the required power.

TABLE 7

| U1 | U2 | G1 | G2 | Total Sum |
|---|---|---|---|---|
|  |  |  | $A_4$ | $A_4$ |
|  |  | $A_3$ |  | $A_3$ |
|  |  | $A_3$ | $A_4$ | $A_3 + A_4$ |
|  | $A_2$ |  | $A_4$ | $A_2 + A_4$ |
|  | $A_2$ | $A_3$ |  | $A_2 + A_3$ |
|  | $A_2$ | $A_3$ | $A_4$ | $A_2 + A_3 + A_4$ |
| $A_1$ |  |  | $A_4$ | $A_1 + A_4$ |
| $A_1$ |  | $A_3$ |  | $A_1 + A_3$ |
| $A_1$ |  | $A_3$ | $A_4$ | $A_1 + A_3 + A_4$ |
| $A_1$ | $A_2$ |  | $A_4$ | $A_1 + A_2 + A_4$ |
| $A_1$ | $A_2$ | $A_3$ |  | $A_1 + A_2 + A_3$ |
| $A_1$ | $A_2$ | $A_3$ | $A_4$ | $A_1 + A_2 + A_3 + A_4$ |
| $A_1$ |  |  |  | $A_1$ |
|  | $A_2$ |  |  | $A_2$ |
| $A_1$ | $A_2$ |  |  | $A_1 + A_2$ |

The generator system controller 101 is configured to compare the total sum of the operation requirements for each of the layouts that is capable of supplying the required power to the loads in Table 6. That is, when the load requirements are $X_1$, the generator system controller 101 determines that any of the layouts represented by the second through $15^{th}$ rows of Table 6 may supply the required power (denoted by high values in the column for $X_1$) and then compares the total sum of operational requirements in the corresponding second through $15^{th}$ rows of Table 7. The generator system controller 101 is configured to select the generator layout with the lowest operational requirements.

In another example, when the load requirements are $X_2$, the generator system controller 101 is configured to determine that any of the layouts represented by the fourth through $15^{th}$ rows of Table 6 may supply the required power (denoted by high values in the column for $X_2$) and then compares the total sum of operational requirements in the corresponding fourth through $15^{th}$ rows of Table 7. The generator system controller 101 is configured to select the generator layout with the lowest operational requirements.

In another example, when the load requirements are $X_{12}$, the generator system controller 101 is configured to determine that any of the layouts represented by the fifth, sixth, eight through twelfth, $14^{th}$, or $15^{th}$ rows of Table 6 may

TABLE 6

| U1 | U2 | G1 | G2 | Power Sum | Load Power ($X_1$) | Load Power ($X_2$) | Load Power ($X_{12}$) |
|---|---|---|---|---|---|---|---|
|  |  |  | X | G2 = A | $X_1 > A$ = low | $X_2 > A$ = low | $X_{12} > A$ = low |
|  |  | X |  | G1 = B | $X_1 < B$ = high | $X_2 > B$ = low | $X_{12} > B$ = low |
|  |  | X | X | G1 + G2 = C | $X_1 < C$ = high | $X_2 > C$ = low | $X_{12} > C$ = low |
|  | X |  | X | U2 + G2 = D | $X_1 < D$ = high | $X_2 < D$ = high | $X_{12} > D$ = low |
|  | X | X |  | U2 + G1 = E | $X_1 < E$ = high | $X_2 < E$ = high | $X_{12} < E$ = high |
|  | X | X | X | U2 + G1 + G2 = F | $X_1 < F$ = high | $X_2 < F$ = high | $X_{12} < F$ = high |
| X |  |  | X | U1 + G2 = G | $X_1 < G$ = high | $X_2 < G$ = high | $X_{12} > G$ = low |
| X |  | X |  | U1 + G1 = H | $X_1 < H$ = high | $X_2 < H$ = high | $X_{12} < H$ = high |
| X |  | X | X | U1 + G1 + G2 = I | $X_1 < I$ = high | $X_2 < I$ = high | $X_{12} < I$ = high |
| X | X |  | X | U1 + U2 + G2 = J | $X_1 < J$ = high | $X_2 < J$ = high | $X_{12} < J$ = high |
| X | X | X |  | U1 + U2 + G1 = K | $X_1 < K$ = high | $X_2 < K$ = high | $X_{12} < K$ = high |
| X | X | X | X | U1 + U2 + G1 + G2 = L | $X_1 < L$ = high | $X_2 < L$ = high | $X_{12} < L$ = high |
| X |  |  |  | U1 = M | $X_1 < M$ = high | $X_2 < M$ = high | $X_{12} > M$ = low |
|  | X |  |  | U2 = N | $X_1 < N$ = high | $X_2 < N$ = high | $X_{12} < N$ = high |
| X | X |  |  | U1 + U2 = O | $X_1 < O$ = high | $X_2 < O$ = high | $X_{12} < O$ = high |

Table 7 illustrates all of the operational requirements of the particular generator layouts of Table 6. Each aggregate sum ($A_1$, $A_2$, $A_3$, $A_4$) for the generator system components. Depending on the components that are connected in each of the generator layouts, a different value, shown as the "Total Sum," is calculated by the generator system controller 101 or accessed from memory.

supply the required power (denoted by high values in the column for $X_{12}$) and then compares the total sum of operational requirements in the corresponding rows of Table 7. The generator system controller 101 is configured to select the generator layout with the lowest operational requirements.

Once the generator system controller 101 has identified the capable layout with the lowest operational requirements from the comparison of potential layouts, the generator system controller 101 may generate a generator system command in response to the comparison.

Figure 6:
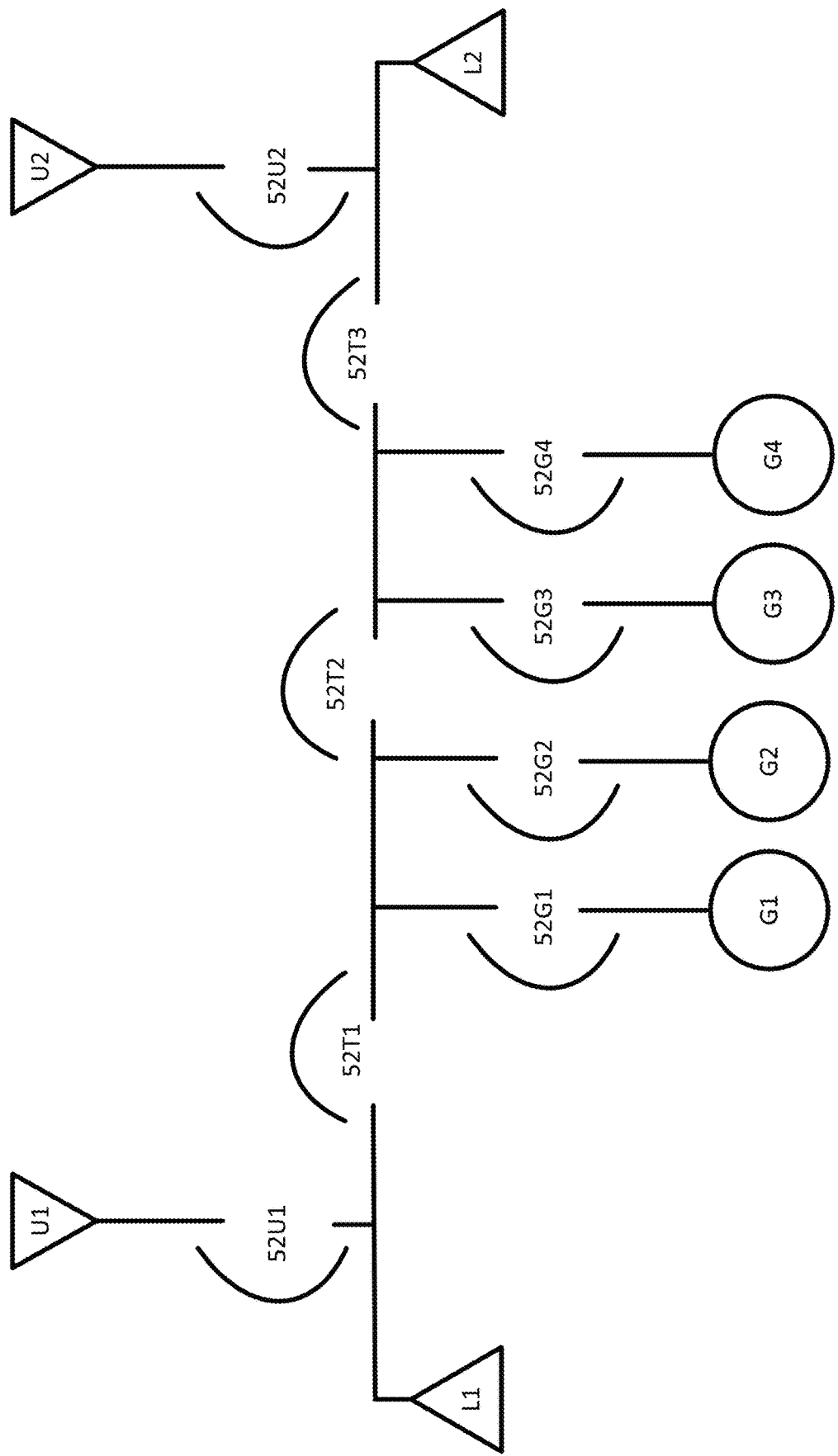
FIG. 6 illustrates yet another example generator system architecture that provides additional operational sequences.

FIG. 6 illustrates another example generator system for variable architecture. The generator system includes a first utility source U1, a second utility source U2, a first load L1, a second load L2, a first generator source G1, a second generator source G2, a third generator source G3, and a fourth generator source G4. A series of breakers 52U1, 52T1, 52G1, 52G2, 52T2, 52G3, 52G4, 52T3, and 52U2 are configured to selectively connect any of the preceding components to any one or more other components in the generator system. Thus, either, none or both of the utility sources, and/or any combination of the generator sources may be connected to either or both of the loads. The generator system controller 101 is configured to control the breakers. Additional, different, or fewer components may be included.

The example generator system in FIG. 6 may be controlled by a single generator system controller 101 or by a plurality of generator systems controllers. The plurality of generator system controllers may be in constant, intermittent or on-time communication with each other. The plurality of generator system controllers may be set up with information individually, share information about the system one time, share information about the system occasionally, or share information about the system continuously. For example, continuous updating about the system may be exchanging voltage, frequency, phase, real power, reactive power, and switch position from each of the plurality of generator system controllers every 10 ms.

The plurality of controllers may be configured to provide redundant operation with each other. The failure of a controller may be detected using a digital signal between generator system controllers, an analog signal between generator system controllers, or a communications signal between generator system controllers.

The generator system controller 101 may store in memory a running sequence for each generator layout for the generator system. The sequence may describe conditions upon which one or more generator sources or one or more utility sources are connected to a load. For example, the sequence may specify the condition upon which one or more breakers are closed. The generator system controller 101 may define a classification for one or more generator sources and an associated circuit breaker or one or more utility sources and an associated circuit breaker. The classifications may be quantified as a cost or sequence requirement that is combinable with other embodiments such as the operational requirements of the generator system.

Example classifications include dead bus prohibited, fast transition, soft transition, extended paralleling, or on-command paralleling. An attribute for each element may be stored by the generator system controller 101. The attribute may describe the classification of each element (e.g., a circuit breaker, a generator source, or a utility source) with a code (e.g., D for dead bus prohibited, F for fast transition, S for soft transition, E for extended paralleling, or O for on-command paralleling). More than one code may be applied to any element. Based on the generator layout a circuit breaker is classified based on the current state of one or more other circuit breakers. An extended paralleling classification means that there is no restriction on the source or circuit breaker regarding other circuit breakers or sources that are connected to the bus at the same time.

Dead bus prohibited means that the element cannot be connected to any other elements if the first element is dead (e.g. has no voltage), in the case of a source, or closed to the dead bus, in the case of a circuit breaker. For example; if a utility source is dead, no switch should connect it to an energized bus. The utility source may be associated with an attribute for dead bus prohibited. A dead bus is a bus that has no voltage or where the voltage is lower than a predetermined threshold. In response to circuit breakers 52U1 and 52U2 being closed, other circuit breakers may be designated as dead bus prohibited. For example, circuit breaker 52G1 may be designated as dead bus prohibited in response to circuit breaker 52U1 being closed, which prevents another source on the generator system from inadvertently sending power to the utility source U1 if the utility source U1 is not powered. Similarly, circuit breaker 52T3 may be designated as dead bus prohibited in response to circuit breaker 52U2 being closed, which prevents another source on the generator system from inadvertently sending power to the utility source U2 if the utility source U2 is not powered. In another example, in response to circuit breakers 52U1 and 52G1 being closed, the generator system controller 101 may assign dead bus prohibited attributes to circuit breakers 52T1 and 52U2, or in response to circuit breakers 52T3 and 52U2 being closed, the generator system controller 101 may assign dead bus prohibited attributes to circuit breakers 52G3 and 52G4. The closure of circuit breaker 52G2 in addition to either set (52U1/52G1 or 52T3/52T2/52U2) may cause the generator system controller to assign dead bus prohibited attributes to circuit breakers 52T1, 52U2, 52G3, and 52G4.

An open transition classification means that no other element may be closed to the bus at the same time. For example, when circuit breaker 52T1 is closed and assigned an open transition classification, 52U1 cannot be closed. When circuit breakers 52T1 and 52G2 are closed and either is assigned an open transition classification, circuit breakers 52U1, 52G1, and 52T2 cannot be closed. Other examples are apparent from the generator layout of FIG. 4 and other generator systems are possible.

A fast transition classification means that the element may be closed to the bus, but only temporarily, at the same time as other elements. The time period for may be user configurable. The time period may be 50 milliseconds, 100 milliseconds, 1 second, or another value. The fast transition classification prohibits any other circuit breakers may be closed for any time greater than the fast transition time period. For example, when circuit breaker 52T1 is closed and assigned a fast transition classification, the generator system controller 101 may allow 52U1 to be closed for a period of time before either 52T1 or 52U1 must be opened. When circuit breakers 52T1 and 52G2 are closed and either is assigned a fast transition classification, circuit breakers 52U1, 52G1 and 52T2 may be closed until the time period passes. Other examples are apparent from the generator layout of FIG. 4 and other generator systems are possible.

A soft transition means that that the circuit breaker and another breaker can be closed to the bus at the same time, but only for a limited time period while load is transferred from one source to another. The limited time period may be set by the user or associated with a particular source. Examples for the limited time period may be 30 seconds, 1 minute, or another length of time. Some soft transition examples may be similar to the fast transition examples above, where the soft transition time period is general longer than the fast transition time period.

An on-command paralleling classification means that a signal is received from a source that determines whether or not other sources or circuit breakers may be closed to the bus. The generator system controller 101 may receive from a utility source a signal that authorizes generators to be connected to or disconnected to from the bus. The generator system controller 101 is configured to close a generator circuit breaker to provide supplemental power to the load and/or the utility for peak shaving during peak times. There may be a negative cost associated with the generator for these situations.

Figure 7:
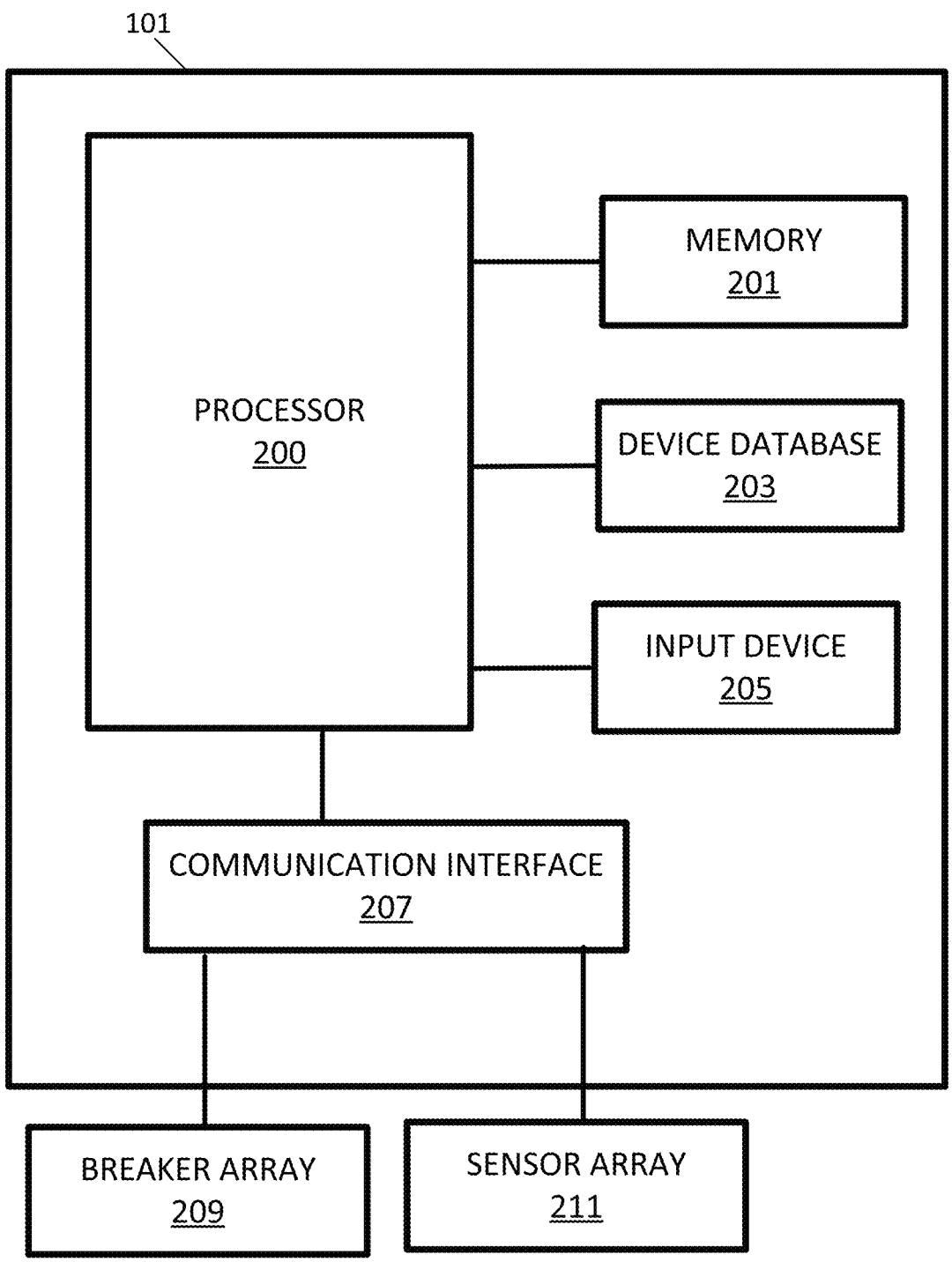
FIG. 7 illustrates an example generator system controller.
Figure 8:
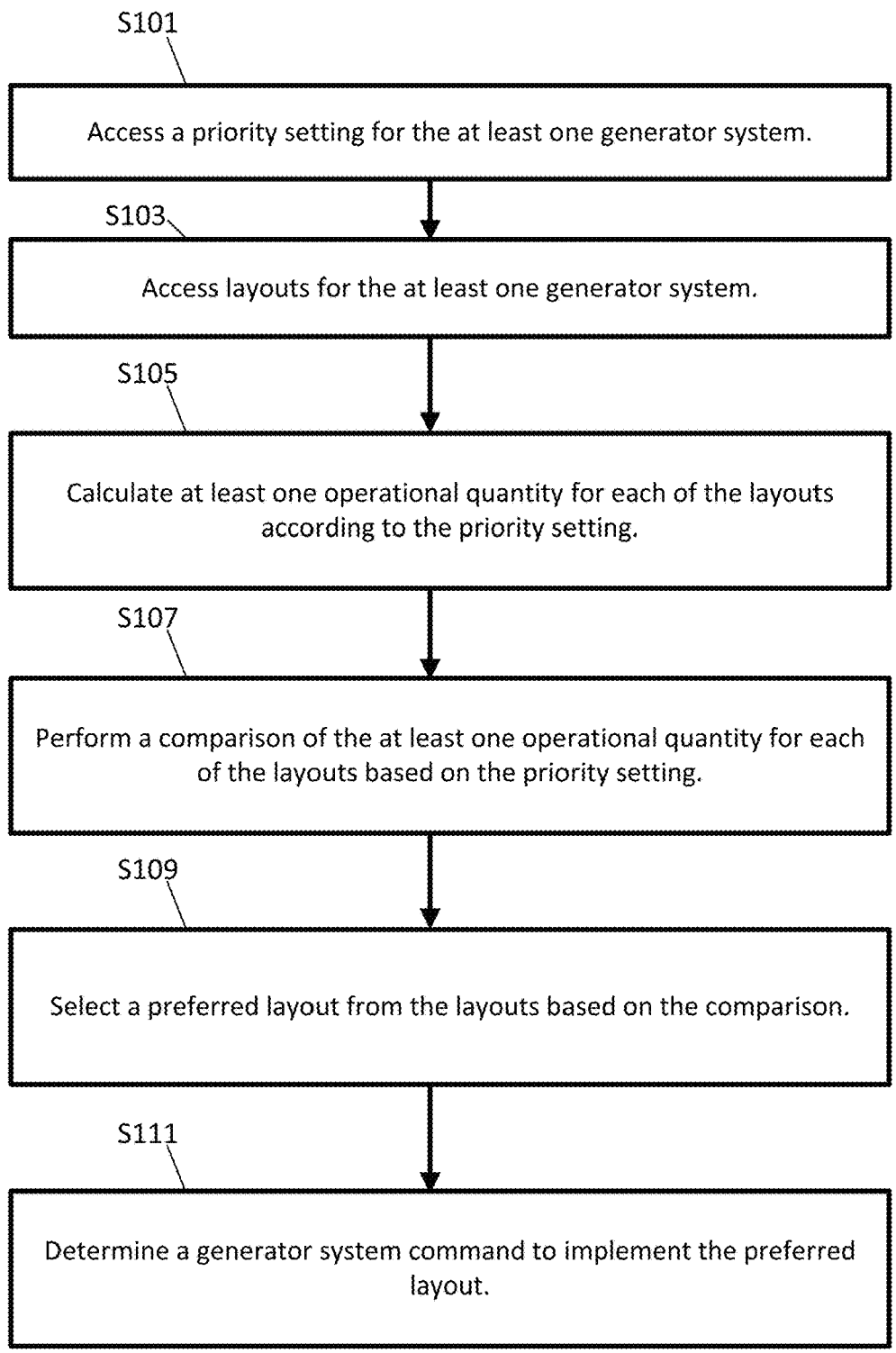
FIG. 8 illustrates an example flowchart for selecting a generator layout.

FIG. 7 illustrates an example generator system controller 101. The generator system controller 101 includes a processor 200, a memory 201, a device database 203, an input device 205 (e.g. keypad, touchscreen, voice recognition, wireless, etc), and communication interface 207. The communication interface 207 is connected to a breaker array 209 and a sensor array 211. Additional, different, or fewer components may be included. FIG. 8 illustrates an example flowchart for selecting a generator layout. Additional, different, or fewer components may be included.

The memory 201 may be a means for storing a priority setting for at least one generator system. The priority setting may include a priority for a particular cost or requirement of the generator system. The priority setting may include multiple priorities, or an ordered list (e.g., first priority, second priority, and so on) of different types of costs or requirements of the generator system. Examples costs or requirements may include at least one generator system ranks input requirements, maintenance requirements, or environment requirements. The communication interface may be a means for receiving the generator layouts or architectures for the generator system.

At act S101, the processor 200 accesses a priority system for the generator system. The processor 200 may include a module or may be apportioned to include an application specific controller or integrated circuit as a means for accessing a priority setting. The processor 200 may be configured to access the stored priority setting for the generator system.

At act S103, the processor 200 accesses layouts for the generator system. The processor 200 may include a module or may be apportioned to include an application specific controller or integrated circuit as a means for accessing multiple layouts for at least one generator system. Each layout may include at least one generator, at least one breaker, at least one bus, at least one load connection and at least one utility connection.

At act S105, the processor calculating operations requirements for the elements of the generator layouts. The processor 200 may include a module or may be apportioned to include an application specific controller or integrated circuit as a means for calculating at least one operational quantity for each of the layouts according to the priority setting. The processor 200 may determine operational quantities for the requirements or costs of installing or maintaining the generator layout. The device database 203 is means for storing the operational quantities of the various elements of the generator system. For example, the device database 203 may include at least one generator parameter and at least one breaker parameter.

At act S107, the processor 200 compares the operating costs or requirements for the elements of the generator layouts. The processor 200 may include a module or may be apportioned to include an application specific controller or integrated circuit as a means for performing a comparison of the at least one operational quantity for the layouts based on the priority setting.

At act S109, the processor 200 may also select a preferred layout from the layouts based on the comparison and determine a generator system command to implement the preferred layout. The generator system command may include an initialization instruction to start a generator or configure at least one breaker setting to open or close the breaker. The processor 200 may include a module or may be apportioned to include an application specific controller or integrated circuit as a means for selecting the preferred layouts.

At act S111, the processor may calculate a system command to implement the preferred layout. The processor 200 may include a module or may be apportioned to include an application specific controller or integrated circuit as a means for implementing a generator layout. The generator layout may be implemented by closing one breaker or a set of circuit breakers to a bus to connect elements of the generator layout together. Thus, the system commands are open or close commands for circuit breakers. Alternatively, the system command may be instructions for ignition of one or more engines associated with generators in the generator layout.

The sensor array 211 includes one or more types of sensors for measuring the operation of the generator system. An example sensor may be a generator sensor that determines whether the generator is in operation or not. The generator sensor may also be configured to detect an output of the generator. Another example sensor is a load sensor configured to detect a load on the generator system. Another example sensor may be a secondary sensor used to determine validity of a primary sensor. The processor 200 may calculate usage statistics of the generator based on running time detected by the generator sensor or usage statistics based on the output of the generator. In selecting the optimal generator layout, the processor is configured to calculate a load value from the at least breaker parameter and compare the at least one generator parameter to the load.

Figure 9:
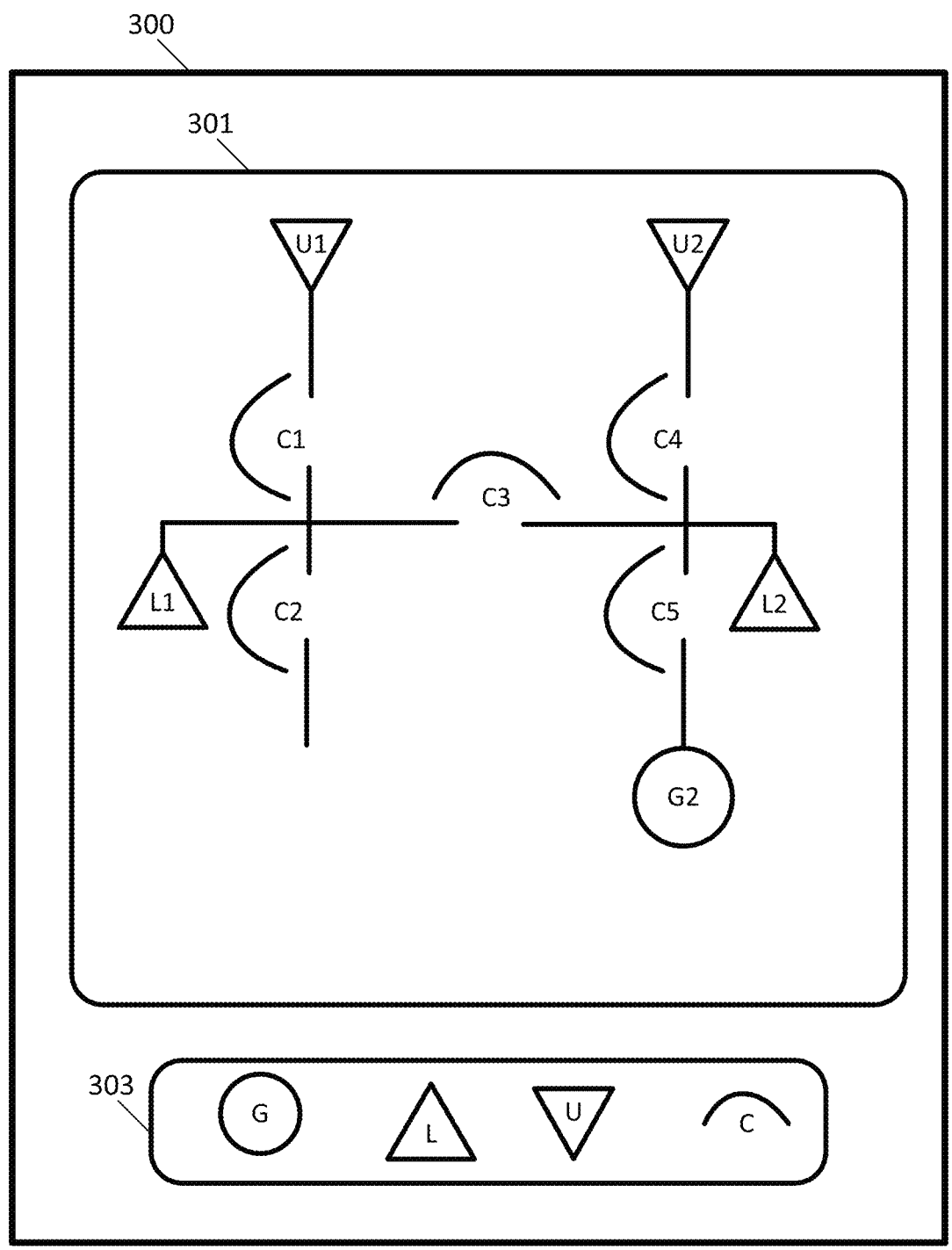
FIG. 9 illustrates an example interface for specifying a generator layout.

FIG. 9 illustrates an example interface 300 for specifying a generator layout. One or more portions of the interface 300 may be implemented by input device 205, as illustrated in FIG. 7. The interface 300 includes a generator system diagram interface 301 and a component palette interface 303. The generator system diagram interface 301 provides or displays an image of the current design of the generator system and, which is modified based on user inputs provided to the generator system diagram interface 301. For example, a user may drag and drop a generator system component from the component palette 303 to the generator system diagram interface 301. The interface 300, which may be implemented by input device 205, is a means for inputting data to the generator system interface.

A user may enter one or multiple generator layouts through the generator system diagram interface 301. As elements are selected in the component palette 303 and connected with other elements in the generator system diagram interface 301, a generator layout is constructed. In one example, elements are dropped onto a single-line diagram. The user may also enter characteristics of the elements in the generator layout such as the ranks input requirements, maintenance requirements, or environmental requirements. The user may enter a priority setting that prioritizes the various types of requirements of the system. The user may enter transition classifications for the elements such as the dead bus prohibited, fast transition, soft transition, extended paralleling, or on-command paralleling.

The generator system controller 101 may determine the generator system from the elements entered into generator system diagram interface 301. In addition, the generator system controller 101 may perform a simulation based on the generator layouts, characteristics of the elements, and the transition classifications based on one or more scenarios. The scenarios may include sets of possible conditions of the generators, utilities, and loads that occur over time. The scenarios may step through variations on the sources (e.g., surges, open circuits, short circuits, faults, over current conditions, or other events) that occur based on external events (e.g., weather, lightening, malfunctions, operator error, or other events). The scenarios may be entered by the user (e.g., via input device 205) or be a predetermined series of scenarios.

Alternatively, the layout selection logic may be performed on a separate device while simulating the operation of components in the generator system. This may allow analysis and review of the system operation without the need for a generator system controller. In another alternative, a separate device may perform the actions of a generator system controller. In yet another alternative, the generator system controller may provide the generator system diagram interface.

The generator system diagram interface 301 may provide the outputs of the generator system based on these scenarios. The user may adjust the generator layouts, the characteristics of the elements of the generator layouts, the requirements of the elements of the generator layouts, and the classifications of the elements of the generator layouts.

A user may enter one or multiple generator layouts through a rule or constraint design interface. The generator system controller 101 may present a series of questions to a designer of the generator system. The generator system controller 101 may generate the series of questions based on a finite number of options and according to any of the rules and constraints described herein. Example questions may include a request for the specifications of source elements, load elements, switch elements, and distribution elements. Example questions may include 'allow G1 to parallel to other generators?', 'allow G1 to parallel to utility sources?', or 'what type of transition is performed by this element?'.

Once the generator layouts and at least one initial rule and/or constraint have been entered, the generator system controller 101 may simulate scenarios. The rules may be changed and adjusted in real time. The generator system controller 101 may simulate selection of the sources that are paired with a particular load and provide the user with the opportunity to adjust any of the rules or constraints and repeat the simulated selection of sources. Through the modification of the rules and constraints, the user's expectations can be matched with the actual behavior of the generator system.

The generator system controller 101 may store the final set of rules and constrain in a data file for the user. The generator system controller 101 may generate a program that is implemented for a controller with the implementation for the user. The generator system controller 101 may generate a set of documentation that explains the operation of the generator system according to the data file. Because the user can view a simulation of the generator system, the user can more easily see any unintended functionality than by comparing sequence charts. Often customers are unfamiliar with the format and approve sequence charts that do not match their desired functionality. Because no additional programming of the system is necessary after the rules have been developed for an approved sequence, the possibility of human error in the translation of the sequence tables is eliminated. In addition, this method provides a more completely tested sequence.

The processor 200 may include a digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 207 may include any operable connection. An operable connection may be one in which signals, physical communications, and/or logical communications may be sent and/or received. An operable connection may include a physical interface, an electrical interface, and/or a data interface.

The communication interface 207 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 201 or database 207) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

We claim:

1. An apparatus for management of a generator system, the apparatus comprising:
    a memory storing a table describing a plurality of generator architecture layouts including interrelated connections for elements of the generator system; and
    a generator system controller configured to calculate a power sum for each of the plurality of generator architecture layouts based on power usage of the elements of the generator system and identify selected generator architecture layouts the plurality of generator architecture layouts based on a comparison of respective power sums of the plurality of generator architecture layouts to a required lower power,
    the generator system controller further configured to determine a plurality of requirements for each of the selected generator architecture layouts and identify a preferred generate architecture layout based on a user priority setting that ranks the plurality of requirements,
    wherein the plurality of requirements describe inputs essential to run the element of the generator system, resources required for maintenance of the element of the generator system, and a factor for lifetime of the element of the generator system.

2. The apparatus of claim 1, wherein the elements of the generator system includes at least one generator, at least one breaker, at least one bus, at least one load connection and at least one utility connection.

3. The apparatus of claim 1, wherein the plurality of generator architecture layouts includes a plurality of breakers configured to electrically connect one or more loads to the generator system.

4. The apparatus of claim 1, wherein the interrelated connections for elements of the generator system include circuit breakers associated with identifiers in the table describing the plurality of generator architecture layouts.

5. The apparatus of claim 1, wherein the plurality of requirements includes a temporal variable.

6. The apparatus of claim 5, wherein the temporal variable includes a variance in cost or availability of a utility source.

7. The apparatus of claim 5, wherein the temporal variable includes a variance in cost of operation of a generator.

8. The apparatus of claim 1, wherein the memory also includes one or more rules or constraints that define a duration that one or more elements of the generator system can be connected to a bus or a load.

9. The apparatus of claim 8, wherein the duration is a limit for connections of one or more source elements or one or more load elements to a generator.

10. The apparatus of claim 9, further comprising:
    an interface configured to receive the priority setting that includes a predetermined order that ranks the plurality of requirements of the generator system.

11. A method for generator management of a generator system, the method comprising:
    accessing a table describing a plurality of generator architecture layouts describing interrelated connections for elements of the generator system;
    calculating a power sum for each of the plurality of generator architecture layouts based on power usage of the elements of the generator system;
    identifying selected generator architecture layouts the plurality of generator architecture layouts based on a comparison of respective power sums of the plurality of generator architecture layouts to a required lower power;
    determining a plurality of requirements for each of the selected generator architecture layouts; and
    identifying a preferred generate architecture layout based on a user priority setting that ranks the plurality of requirements,
    wherein the plurality of requirements describe inputs essential to run the element of the generator system, resources required for maintenance of the element of the generator system, and a factor for lifetime of the element of the generator system.

12. The method of claim 11, wherein the elements of the generator system includes at least one generator, at least one breaker, at least one bus, and at least one load connection.

13. The method of claim 11, wherein the plurality of generator architecture layouts includes a plurality of breakers configured to electrically connect one or more loads to the generator system.

14. The method of claim 11, wherein the interrelated connections for elements of the generator system include circuit breakers associated with identifiers in the table for the plurality of generator architecture layouts.

15. The method of claim 11, wherein the plurality of requirements includes a temporal variable for a variance in cost or availability of a utility source or a variance in cost of operation of a generator.

16. The method of claim 11, wherein the table includes one or more rules or constraints may define a duration that one or more elements of the generator system can be connected to a bus or a load.

17. An apparatus for management of a generator system, the apparatus comprising:
    an interface configured to receive a priority setting that includes a predetermined order for a plurality of requirements of the generator system;
    a memory storing a table describing a plurality of generator architecture layouts describing interrelated connections for elements of the generator system; and
    a generator system controller configured to calculate a power sum for each of the plurality of generator architecture layouts based on power usage of the elements of the generator system and identify selected generator architecture layouts the plurality of generator architecture layouts based on a comparison of respective power sums of the plurality of generator architecture layouts to a required lower power,
    the generator system controller further configured to determine a plurality of requirements for each of the selected generator architecture layouts and identify a preferred generate architecture layout based on a user priority setting that ranks the plurality of requirements,
    wherein the plurality of requirements describe inputs essential to run the element of the generator system, resources required for maintenance of the element, and a factor for lifetime of the element.

* * * * *